United States Patent [19]
Crabtree

[11] Patent Number: 5,119,763
[45] Date of Patent: Jun. 9, 1992

[54] ORTHOPEDICALLY DESIGNED SANITARY PET BED

[76] Inventor: Marianne Crabtree, P.O. Box 111, Glenview, Ill. 60025

[21] Appl. No.: 725,155

[22] Filed: Jul. 3, 1991

[51] Int. Cl.$^5$ ............................................. A01J 1/00
[52] U.S. Cl. ........................................ 119/28.5; 5/420
[58] Field of Search ................... 119/28.5; 5/417, 419, 5/418, 420

[56] References Cited

U.S. PATENT DOCUMENTS

| | | | |
|---|---|---|---|
| 2,883,682 | 4/1959 | Kwake | 5/419 |
| 2,922,553 | 1/1960 | Wilson, III | 5/417 X |
| 3,537,116 | 11/1970 | Kain | 5/420 |
| 3,565,040 | 2/1971 | Pohl | 119/28.5 |
| 3,902,456 | 9/1975 | David | 119/28.5 |
| 4,231,125 | 11/1980 | Tittl | 5/419 |
| 4,500,129 | 2/1985 | Hahn | 5/420 X |
| 4,546,507 | 10/1985 | Weinstein | 5/419 |
| 4,980,935 | 1/1991 | Kazanowski et al. | 5/419 |
| 4,991,245 | 2/1991 | Franco | 5/417 X |

FOREIGN PATENT DOCUMENTS 1047698 7/1953 France ................................. 5/419

Primary Examiner—Gene Mancene
Assistant Examiner—Thomas Price
Attorney, Agent, or Firm—James G. Staples

[57] ABSTRACT

The invention relates to an orthopedically designed, easily washable animal bed. The present invention utilizes a specially designed quilting pattern which provides proper orthopedic support for the sleeping or resting animal. The bed is easily machine washable and filled with sanitary material so that the bed is far more sanitary than existing animal beds. The bed is also designed so that a recess in the bed may be created so that the sleeping animal is able to satisfy its inborn instinct to withdraw into a recess while sleeping.

10 Claims, 3 Drawing Sheets

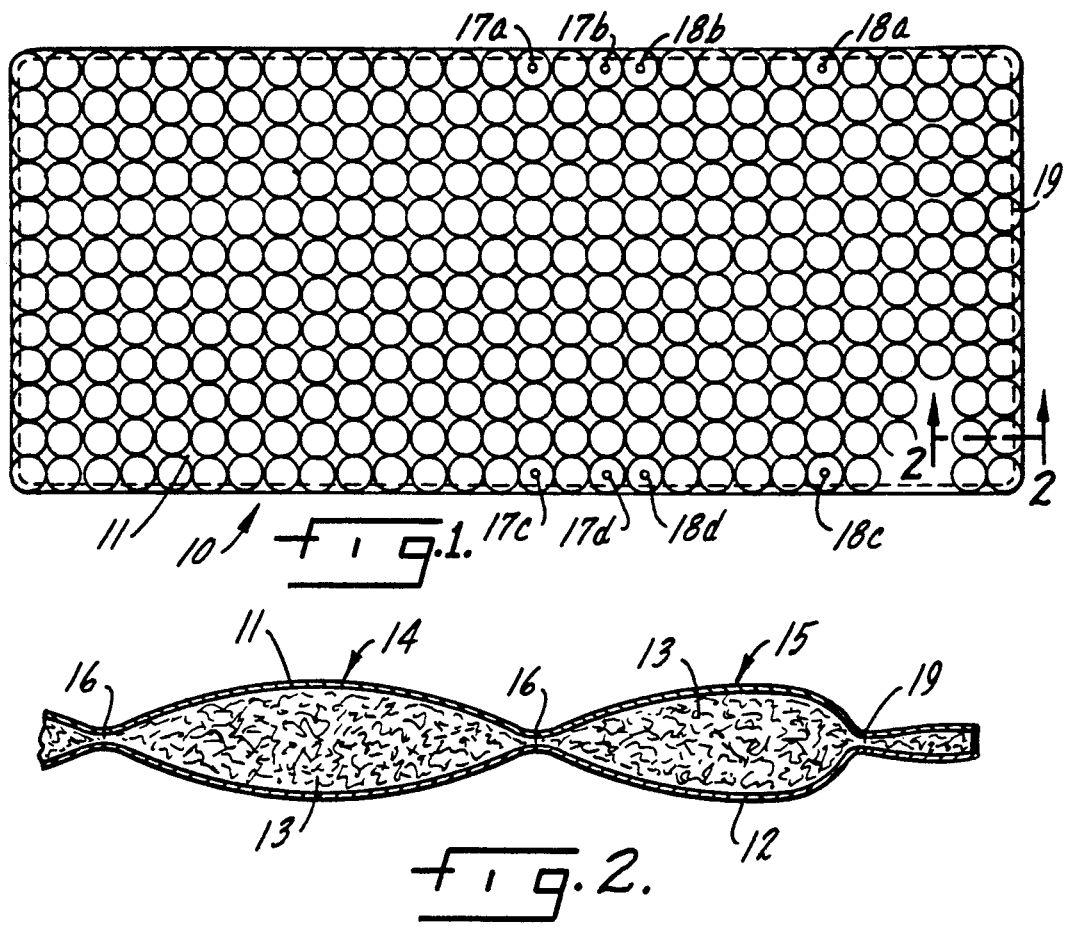
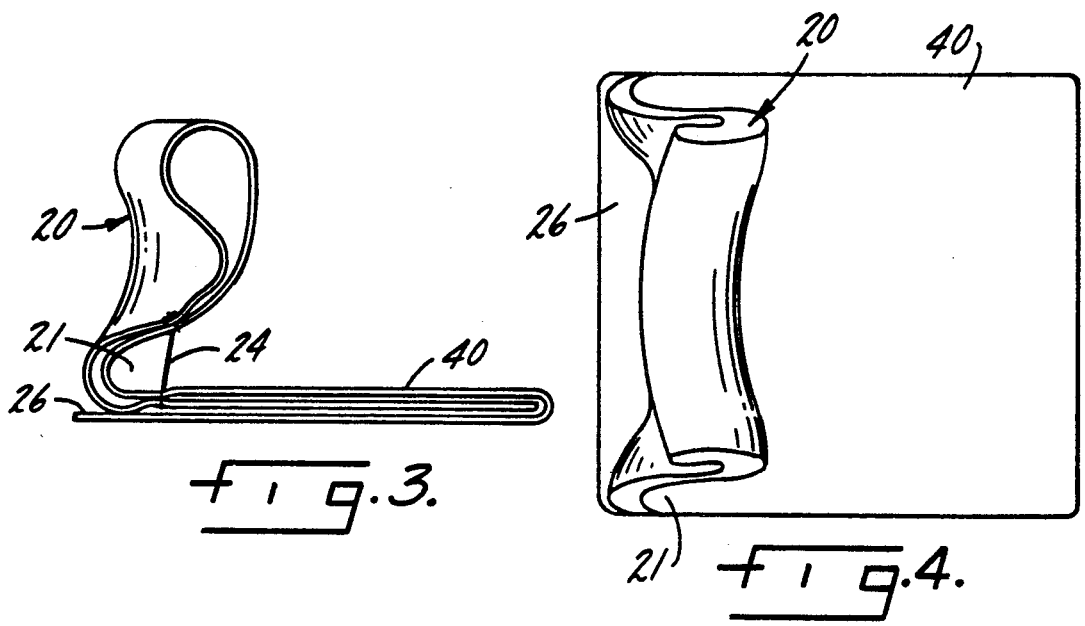

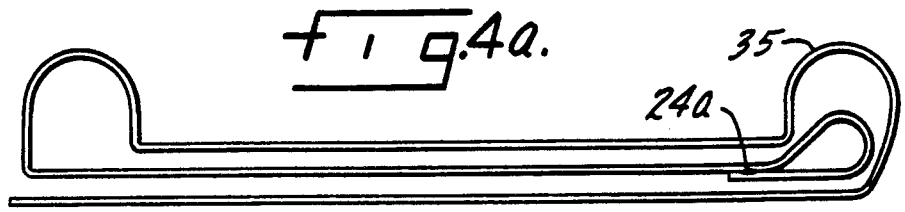
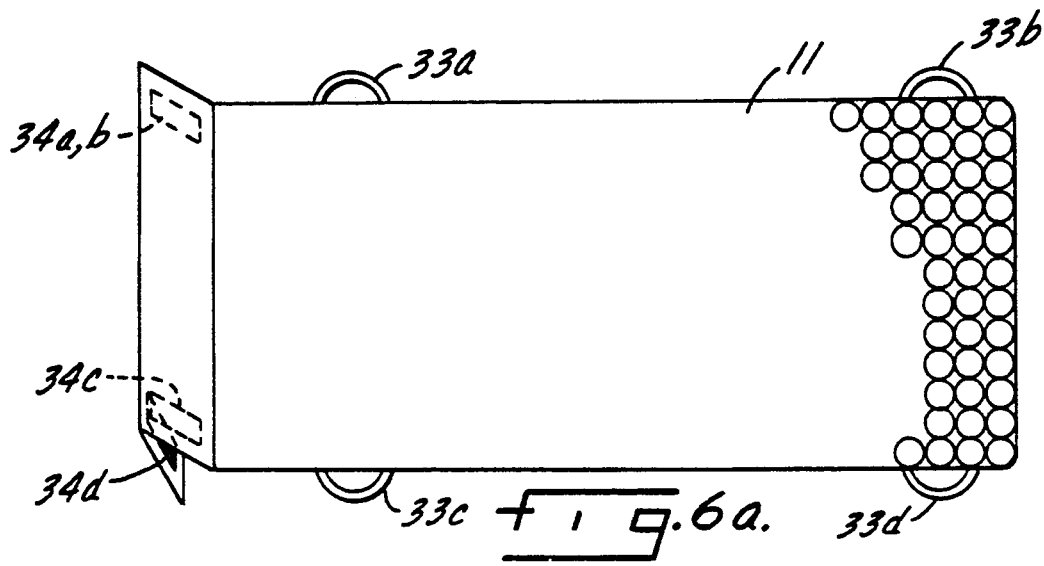
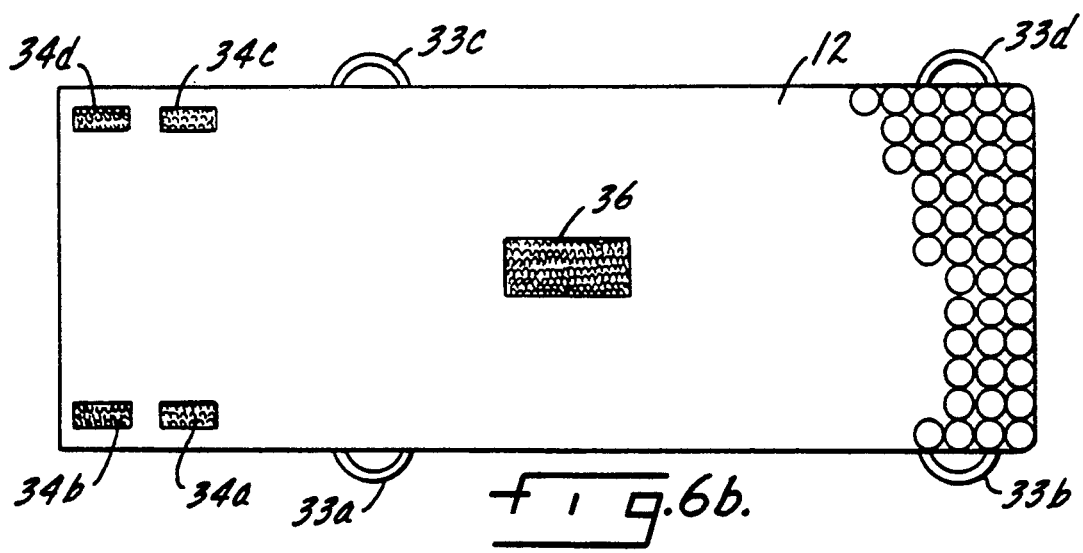
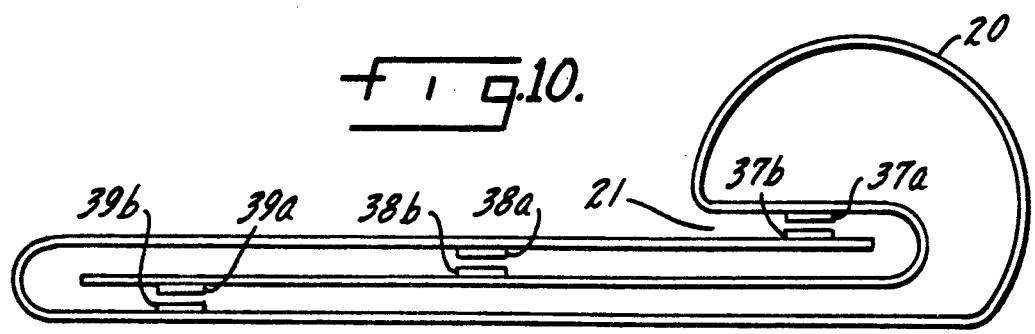

ORTHOPEDICALLY DESIGNED SANITARY PET BED

BACKGROUND OF THE INVENTION

This invention relates generally to animal beds and specifically to animal beds which are made of specially quilted fabric and are fiber filled.

Existing animal beds are not entirely satisfactory for what should be the ultimate objective of a animal bed: the comfort and physical well-being of the animal. Animal beds currently on the market are often filled with potentially hazardous materials, provide too soft or too hard a sleeping surface, and are often unsanitary or otherwise harmful to the animal. The present invention employs a special scientifically designed quilting pattern which will provide proper skeletal and orthopedic support for the sleeping animal. At the same time, this quilting pattern gives the animal a soft, comfortable surface on which to lie. In addition, because the bed is fiber filled rather than filled with foam rubber or polyurethane foam and is easily snapped apart, the bed is easily washable and dryable in a conventional home washer/dryer. This makes the bed far more sanitary and resistant to bacteria than current animal beds which are difficult if not impossible to wash. In addition, the foam or foam rubber used in many animal beds acts like a sponge, drawing in moisture and body fluids and holding them there—thus presenting an even greater risk of harboring bacteria.

The specially designed stitching that forms the quilting pattern which surrounds each quilted units acts as a baffle, insuring that the fiber fill remains in place and will not ball or bunch up after washing or prolonged use of the bed. Animal beds currently on the market do not use continuous quilted-in baffles to keep the filling in place. As a result, prior art animal beds tend to lose their shape after washing. By keeping the fiber fill in place, the bed dries faster and more thoroughly and the baffle employed in the present invention allows the bed to retain its original orthopedic design at all times.

In addition, the fiber fill used in the present invention is safer for the animal than the cedar shavings, polyurethane foam, stylene pellets, or similar fillings commonly used in animal beds. Scientific research conducted by veterinarians and universities has shown the use of cedar shavings in beds causes potentially serious respiratory problems and allergic reactions in animals, and synthetic foam can result in mold breeding when left moist.

The multiple layer design of the bed of this invention is also important in that it allows for the free flow of air between the layers of the quilted fabric to reduce animal odors, offer fast air-drying of any moisture or liquid that may come in contact with the quilted layers, and helps further reduce the possibility of mildew and bacteria growth between washings of the bed. The bed is also designed to be light and easily transportable. The bed is all purpose in function in that it may be disassembled, folded in half, and used as a car or travel bed. The bed may also be placed on the bottom of animal crates or cages for pets that are being housebroken or left at home during the day.

Further, many animals, particularly dogs, have an inborn instinct to withdraw into recesses while sleeping. The present invention is designed with recesses in order to satisfy the animal's instinct. Also, the bed's multiple layer design permits free flow of air which makes the top surface of the bed warmer in the winter and cooler in the summer. The fabric used in making the bed is insulatory to further insure that the bed remains at a comfortable temperature for the animal. The multiple layering also insures that the bed maintains its orthopedic design at all times and will not become hard or out of shape.

The bed may be made in multiple sizes to maximize comfort for all animals, from the smallest kitten to the largest St. Bernard. Also, the bed is easily adjustable to accommodate animals of all sizes by simply adjusting the fold lines of the bed.

SUMMARY OF THE INVENTION

An important object of the present invention is to provide a bed which is specially designed to provide proper skeletal and orthopedic support and comfort for the sleeping animal.

A further object of the present invention is to provide an animal bed in which the design of the quilting acts as a baffle to contain the filling of the bed so that the bed will retain its orthopedic design.

A further object is to provide an animal bed which is easily machine washable so that the bed will be more sanitary and consequently, is healthier for the animal than conventional animal beds.

A further object is to provide an animal bed which is filled with safe, non-toxic material.

A further object is to provide a bed which satisfies the animal's inborn instinct to withdraw into a recess while sleeping.

A further object is to provide a bed which is light, allows the free flow of air, and is easily transportable.

BRIEF DESCRIPTION OF THE DRAWINGS

The invention is illustrated more or less diagrammatically in the drawing, wherein:

FIG. 1 is a top plan view of a preferred embodiment of the animal bed of this invention when utilized in a flat condition;

FIG. 2 is a section view taken substantially along the line 2—2 of FIG. 1;

FIG. 3 is a side view of the animal bed of FIG. 1 in a formed position;

FIG. 4 is a top plan view of the bed in its formed position;

FIG. 4a is a side view of the animal bed of FIG. 4 which uses a raised front section;

FIG. 6a is a top plan view of another alternate embodiment;

FIG. 6b is a bottom plan view of the alternate embodiment shown in FIG. 6a;

FIG. 10 is a side view of another alternative embodiment.

DETAILED DESCRIPTION OF THE INVENTION

Figure 5:
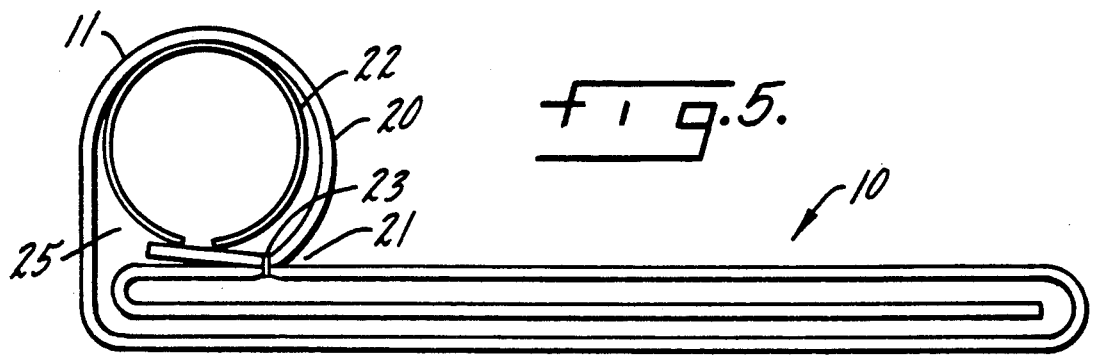
FIG. 5 is a side view of an alternative embodiment.

Like reference numerals will be used to refer to like or similar parts from Figure to Figure in the drawing.

Referring first to FIGS. 1 and 2, the animal bed of this invention is indicated generally at 10. It includes an outer surface consisting of a top layer of soft textured fabric 11, and a bottom layer of soft textured fabric 12. The space between top layer 11 and bottom layer 12 is filled with a soft, resilient filling material 13. The filling material should have the characteristic of resisting bunching or balling when subjected to forces and moisture. Two ounce fibre fill has been used satisfactorily. The space between top and bottom layers 11 and 12 is sub-divided into a plurality of quilted units, two of which are indicated generally at 14 and 15. The quilted units, such as 14 and 15 are separated by stitching 16 which traverses the perimeter of each quilted unit. In this instance the quilted units are circular. A diameter of from about 1" to about 5" will be suitable, though about 3 inches is preferred. As will be understood by those skilled in the art, the subdivision of the height between the top and bottom layers as defined initially by the quilt stitching 16 and edge stitching 19 is desirable to avoid displacement of the filling 13 during washing and, also, to ensure that a soft, mattress-like structure is provided throughout the entire area defined by the outer boundaries. A series of fastening means 17a-d and 18a-d, e.g. snaps, are located generally along the sides of the top layer 11.

FIGS. 3 and 4 demonstrate how the bed can be put into a formed condition by folding a portion of the bed on top of itself with the additional length of the bed between the top and bottom surfaces to form a first section 40 upon which the animal can be received and a second section or headrest 20. Fastening means such as 17a and 18a together with fastening means 24 are employed to secure the folded layers and provide additional stability to the headrest 20 which is created by folding and securing the bed in the manner described above. The modulus of stiffness of the material of the animal bed 10 is related to the length of the second section 20, such that when fastening means such as 17a and 18a are engaged, the second section 20 has sufficient stiffness to remain in a generally vertical, upright position. A recess 21 into which the animal can withdraw is formed by folding the bed in the manner described herein. By folding the top two layers downward on an angle toward the bottom layer and at the same time forming a slight concavity in the headrest folds, the back corners of the recess 21 tend to angle outwardly. This configuration helps stabilize the headrest 20 as the back corners tend to act like rudders by bracing the headrest 20. It should be further noted that the bottom layer of fabric 26 extends somewhat past where the two top layers form the headrest 20. Configuring the invention in this manner further stabilizes the back section of the headrest 20 so that it will not fall back upon itself.

FIG. 4a discloses a variation on the embodiment of the invention described by FIGS. 3 and 4 in which additional fastening means 24a may be employed to join a small portion of the inner layer of fabric. Constructing the bed in this fashion will create a berm 35 on the front end of the bed which will, in turn, stabilize the front end of the bed.

FIG. 5 discloses a three-layer alternate embodiment of the invention in which no fastening means are employed to create a headrest 20 and recess 21. Instead, the headrest 20 and recess 21 are created by placing a cylindrical insert 22, for example, a cylindrical pillow roll 22, inside a hollow section 25 of the top surface 11 which is doubled back upon itself. If desired, a fastener 23, such as a snap, may be used to ensure that the end of the blanket continues to form hollow section 25.

Figure 6:
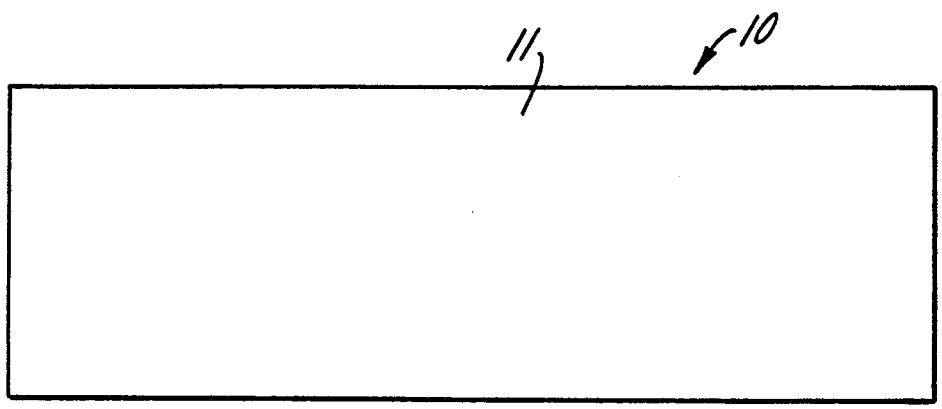
FIG. 6 is a top plan view of another alternative embodiment.
Figure 7:
FIG. 7 is a side view of the alternative embodiment in FIG. 6 folded back upon itself.

FIGS. 6 and 7 disclose an alternate embodiment of the invention in which no recess or headrest is formed. This embodiment is particularly suited for somewhat larger animals, for example, what veterinarians refer to as "long-bodied dogs." Configuring the invention in this fashion will also allow the invention to serve as a "crate pad"; that is, the invention may be placed in the bottom of an animal crate or cage.

FIGS. 6a and 6b disclose the alternate embodiment described in FIGS. 6 and 7 with additional fastening means 33a-33d, 34a-34d, and 36. The fastening means 33a-33d, which may be hook and loop fasteners or any other suitable fastening devices, are sewn onto the edge of the top surface 11. The invention may then be secured in the animal crate or cage by looping the fastening means 33a-33d around the metal bars of the crate or cage. This will insure that the invention will remain stationary inside the crate or cage. Fastening means 36, for example, velcro tape, may be placed on the bottom layer of fabric 12, and may be joined with complementary fastening means placed on the floor of the crate or cage to secure the bottom layer of fabric to the crate or cage. It is also noted that the invention may be adjusted for crates of various lengths by folding the back portion of the top surface 11 back upon itself as illustrated in the drawing. Additional fastening means 34a, 34b, 34c, and 34d, such as velcro tape, may be placed on the bottom layer of fabric 12, and used to secure the back portion of the top surface 11 when folded back upon itself so that fastening means 34a is joined to 34b, and 34c is joined to fastening means 34d.

Figure 8:
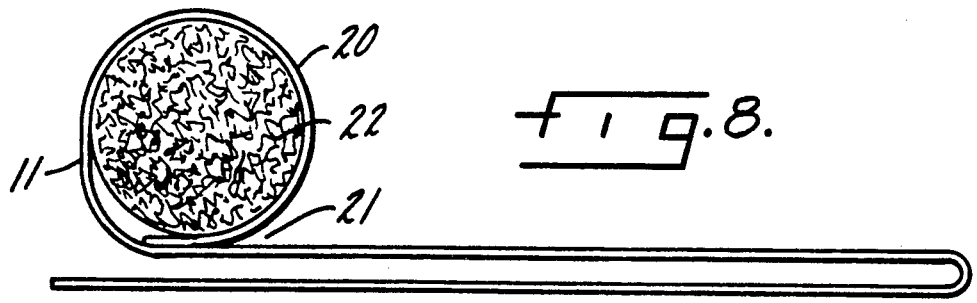
FIG. 8 is a side view of another alternative embodiment.

FIG. 8 discloses a two-layer alternate embodiment of the invention in which no specifically placed fastening means are employed. Instead, a headrest 20 and recess 21 are created by placing a fiber-filled cylindrical insert 22 inside a section of the top surface 11 which is doubled back upon itself. The frictional forces between the insert 22 and the blanket preclude disassembly.

Figure 9:
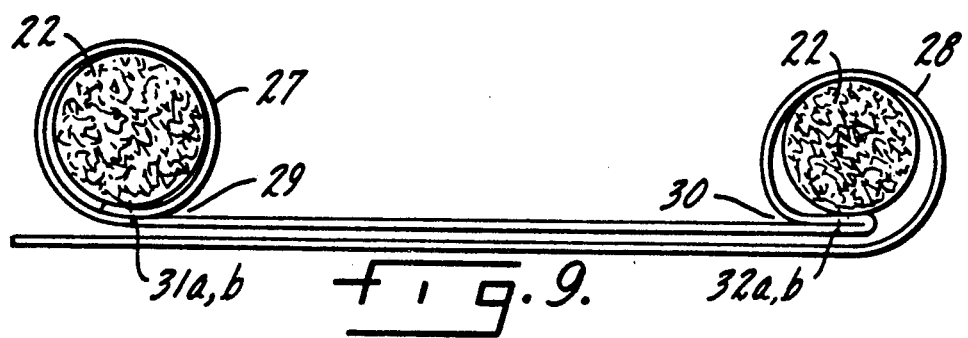
FIG. 9 is a side view of another alternative embodiment.

FIG. 9 discloses yet another two-layer embodiment of the invention in which the bed can be put into a formed condition by employing fastening means 31a and 31b, and 32a and 32b, to create dual headrests 27 and 28 with their associated recesses 29 and 30 respectively.

FIG. 10 discloses a three-layer alternate embodiment of the invention in which fastening means 37a and 37b are employed as shown to create a headrest 20 and recess 21. In addition, fastening means 38a and 38b, such as velcro-type hook and loop tape, are employed to secure the top two layers of this design. Similar fastening means 39a and 39b can be employed to secure the middle and bottom layers of fabric. The use of the fastening means described in this embodiment helps insure that the middle layer of fabric will remain immobile, and also aids the consumer in assembling the invention.

Although a preferred embodiment and several alternatives have been illustrated and described, it will at once be apparent to those skilled in the art that modifications may be made within the spirit and scope of the invention. Hence, the scope of the invention is intended to be defined by the scope of the hereafter appended claims when interpreted in light of the relevant prior art and not solely by the foregoing description.

I claim:

1. A animal bed, which includes:

a first section of a soft, pliable material comprised of an outer surface and inner filling material fashioned in a quilted pattern of a size sufficient to receive an animal in a reclining position, on a flat surface, a second section of a soft pliable material comprised of an outer surface and inner filling material fashioned in a quilted pattern, said second section being capable of extending generally vertically upwardly from one end of said first section, said second section, when in a generally vertically upwardly extending position, forming a partial recess at one end of the first section, said first and second sections being a single sheet-like element, and securing means for fastening the second section to the first section in a generally upright position, the length of said second section being related to the modulus of stiffness of the material such that, when said securing means is engaged, the second section tends to remain in its generally vertical, upright position.

2. The animal bed of claim 1 in which said soft, pliable material is quilted in a pattern which provides orthopedic and skeletal support for the animal.

3. The animal bed of claim 1 in which said soft, pliable material is washable in a conventional washing machine.

4. The animal bed of claim 1 in which said quilted pattern is composed of individual quilted units with an area between one and twenty-five square inches.

5. The animal bed of claim 4 in which said individual quilted units are generally circular in shape.

6. The animal bed of claim 5 in which said individual quilted units are approximately three inches in diameter.

7. The animal bed of claim 1 in which the outer surface of said soft, pliable material is porous.

8. The animal bed of claim 1 in which the outer surface of said soft, pliable material is composed of a soft velour.

9. The animal bed of claim 1 in which said inner filling material of said soft, pliable material is composed of a polyester fiber fill.

10. The animal bed of claim 1 in which a hook-and-loop fastening system may be employed to secure the bed on the floor of an animal crate or cage.

* * * * *